Figure 1:
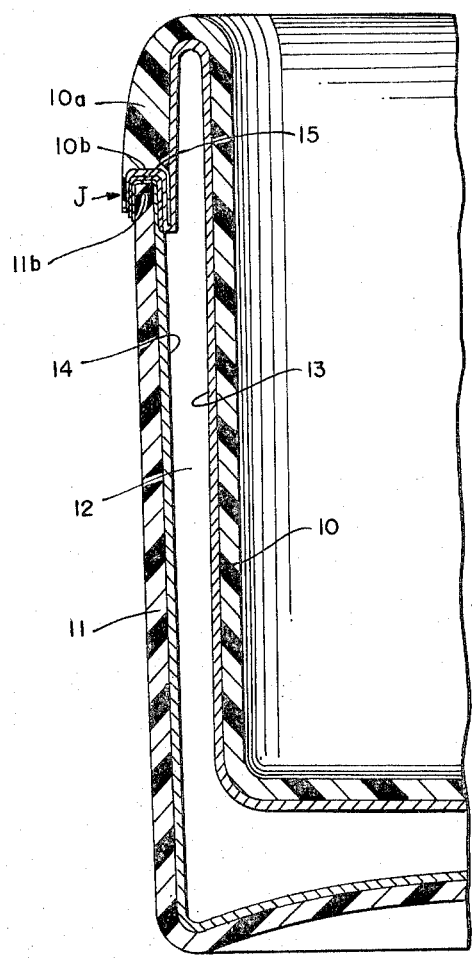

Jan. 3, 1967 W. D. HERRICK ET AL 3,295,709
MANUFACTURED PRODUCT HAVING VACUUM RETAINING PLASTIC WALLS
Filed Oct. 19, 1965

INVENTORS:
WALLACE D. HERRICK
HOWARD W. CHRISTIE
BY: Dawson, Tilton, Fallon, Lungmus & Alexander
ATT'YS

United States Patent Office 3,295,709
Patented Jan. 3, 1967

3,295,709
MANUFACTURED PRODUCT HAVING VACUUM RETAINING PLASTIC WALLS
Wallace D. Herrick, Wichita, Kans., and Howard W. Christie, Kansas City, Mo., assignors to The Coleman Company, Inc., Wichita, Kans., a corporation of Kansas
Filed Oct. 19, 1965, Ser. No. 497,988
5 Claims. (Cl. 220—9)

This invention relates to a manufactured product having vacuum retaining plastic walls, such as an insulated container and more particularly to a double-walled insulated container with an evacuated space between the walls. This application is a continuation-in-part of our copending application Serial No. 305,704, filed August 30, 1963, for "Insulated Container," now Patent No. 3,225,954. Reference is also made to our copending application Serial No. 305,705, filed August 30, 1963.

Heretofore the problem of providing a double-walled vacuum insulated container where one or both of the walls is formed of a plastic material has not been satisfactorily solved. As far as is known, no such insulated containers have been placed in commercial use, although such containers would have many advantages, especially in larger sizes such as one-half gallon and one gallon sizes. Insulated containers and jugs which depend on other insulating means than a high vacuum are in widespread commercial use, but it is well known that vacuum insulation is the most effective for maintaining liquids in a hot or cold state over prolonged periods of time.

The problem in utilizing a plastic material to form one or both of the walls of a vacuum insulated container centers around the fact that plastics are not sufficiently dense and impermeable to maintain the required high vacuum. For effective insulation a vacuum below $10^{-3}$ mm. Hg is required, and the preferred vacuum is in the range of $10^{-6}$ mm. Hg. Thus, even though plastic materials may be impervious for many purposes, the fact that they slowly transmit vapor and air makes the plastic materials unusable for enclosing a space maintained at a high vacuum.

One answer to the above problem with which the present invention is particularly concerned is that of providing the plastic wall with a metallic coating to eliminate air seepage through the plastic, or at least to reduce it to an insignificant level even in relation to the high vacuum which must be maintained for good insulation. The use of a metal coating on the plastic walls, such as an electroplated coating, leads to a further troublesome problem because it is difficult to achieve a mechanically strong and permanent sufficient adherence between the plating and the plastic walls.

Another related problem arises when the vacuum retaining plastic wall is subjected to repeated thermal or mechanical stresses, such as by the expansion and contraction of the wall, or the vibration, or jarring, or flexing of the wall.

It is therefore an object of the present invention to provide an insulated container, or other manufactured product which employs a plastic wall on at least one side of air evacuated space, and which at the same time substantially overcomes the problems and difficulties discussed above. More specifically, it is our object to provide an electroplated vacuum retaining metal coating in combination with a plastic wall, which coating is bonded securely and permanently to the plastic wall, and which is resistant to mechanical and thermal stresses. Further objects and advantages will be indicated in the following detailed specification.

The invention is one illustrative embodiment is shown in the accompanying drawing, in which—

Figure 2:
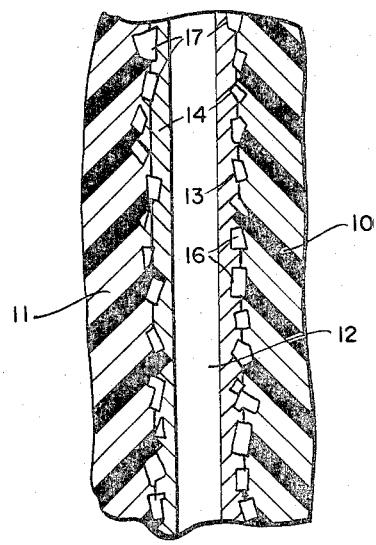

FIGURE 1 is an elevational view taken in vertical section of an insulated container constructed in accordance with the present invention, only the side and a portion of the bottom of the container being shown; and FIGURE 2 is an enlarged, fragmentary sectional view of the metal coated plastic walls which serve as boundary walls for enclosing the evacuated space.

Looking first at the container shown in FIGURE 1, it will be seen that it provides an inner wall 10 and an outer wall 11 with a space 12 therebetween. The fabrication of the container, the space 12 will be evacuated to obtain a high vacuum, such as the vacuum less than $10^{-3}$ mm. Hg, or typically a vacuum of about $10^{-6}$ mm. Hg. This degree of vacuum is desired to maintain good insulating properties, against the transmission of heat by convection through the evacuated space.

In the illustration given, walls 10 and 11 are formed of a plastic material, such as polyformaldehyde resin. Such plastics are commonly referred to as "acetal" plastics, and chemically are stabilized polymerized formaldehyde. The resins from which such plastics are formed are sold under the trade names of Delrin and Celcon. While an acetal plastic is preferred and has been found to give good results, other plastics can be used to form one or both of the walls, such as polystyrene, polypropylene, polycarbamate, polyamides, acrylics, rigid polyvinyl chloride, etc. Since the use of an injection molding procedure is preferred for forming the boundary wall members 10 and 11, it will usually be desirable to employ a thermoplastic material, which is adaptable to an injection molding procedure. However, thermosetting resins can also be used. All synthtic plastics, whether thermoplastic or thermosetting, are per se incapable of forming walls for retaining high vacuums.

In order to reduce the permeability of the plastic walls 10 and 11, these walls are provided with a metal coating, which must be a lead coating to fully accomplish the objects of this invention. Preferably, the lead coating is on the surfaces of the walls facing the evacuated space 10. For example, in the illustration given, the wall 10 is provided with a lead coating 13, while the wall 11 is provided with a lead coating 14. Preferably the coatings 13 and 14 are in the form of continuous layers and extend over the entire surfaces of the walls which adjoin the evacuated space, and also extend into the joint area between the walls, as will subsequently be discussed. An electrodeposited lead coating is preferred. Since the walls 10 and 11 are repeatedly subjected to thermal stresses by the introduction of hot and/or cold liquids into the container, the walls 10 and 11 will be subject to repeated expansion and contraction. It has been found that a lead coating is more durable under such conditions than other types of metal coating. This appears to be due to the fact that a lead coating is softer and more ductile, and is not as subject to work hardening as other types of metal coatings. The overall thickness of the lead coating should be sufficient to give a completely continuous layer, but the thickness can be as little as .1 to 1 mil, if desired, thicker coatings can be used up to 2–3 mils. Usually, a coating of about .5 to 2 mils will be adequate.

It will be understood that this invention is not directly concerned with techniques of electroplating as such, and therefore it is not believed necessary to set out details of electroplating procedures herein. By way of further illustration, however, reference is made to our copending application, Serial No. 305,705, filed August 30, 1963, entitled, "Process of Adhering Plating to a Plastic Body and Products Produced Thereby," which describes suitable electroplating procedures.

The joint J, as indicated in FIGURE 1, is formed between the upper terminal and portions of the walls 10 and 11. In the illustration given, wall 10 at its upper end is provided with an outwardly and downwardly turned annular portion 10a which terminates in an annular recess 10b. This recess is adapted to receive the upper end portion 11b of the wall 11. Preferably, a slip-fit is provided between these members, so that there is very little clearance between the surfaces of the wall and 11b and the opposing surfaces of the wall recess 10b. An adhesive material, such as a low temperature solder, is applied in the joint between the adjacent wall surfaces, thereby uniting the members, and forming the joint connection. This can be done by inserting the solder wire around the inner end of the joint cavity (e.g., annular recess 10b), and heating the joint to melt the solder and cause it to flow around the side of the joint. Some pressure may be applied to force the members together during soldering.

The lead coating 13 extends around the lower end of the terminal wall portion 10a so as to completely cover the surfaces of the annular recess 10b. Similarly, the lead coating 14 on the wall 11 extends around the end portion 11b thereof so that it completely covers all of the wall surfaces which are received within the recess 10b. Consequently, the adhesive or bonding layer 15 unites the wall terminal portions 10a and 11b by adhering respectively to the lead coatings 13 and 14 within the joint area.

In order to promote the adherence of the lead coating to the plastic walls, the immediately underlying surface portions of the walls can be provided with a layer of embedded metal particles, such as the particles in wall 10 and the particles 17 in wall 11, as shown in FIG. 2. The metal particles are preferably embedded so that they have their inner portions surrounded by and anchored to the plastic while also providing outer portions having metal surfaces free of the plastic. The lead coatings 13 and 14 are therefore united more firmly to the portions of the plastic walls containing the embedded metal particles, and this is particularly desirable where the walls will be subjected repeatedly to mechanical and thermal stresses, which might have a tendency to cause the metal coatings to separate from the walls.

This invention is not directly concerned with the method of embedding the metal particles. Generally, the metal particles are preferably embedded while the plastic is in a fluid state, or at least in a soft, tacky condition. This permits the particles to be anchored to the plastic walls, while still permitting their outer faces or outer end portions to be attached to the metal coating. Several procedures for forming the plastic walls with the embedded metal particles are described in the above-cited copending application Serial No. 305,705. In one preferred procedure the metal particles are embedded during an injection molding operation, and are held in place during the injection of the plastic material by an electromagnetic means.

It will be understood that a wide variety of metal particles can be employed in the wall surfaces of the joint areas. The metal particles, of course, should be in a finely-divided condition, that is, in the form of a powder, and the metal should be stable and substantially inert with respect to the plastic into which it is embedded. The alkali and alkaline earth metals are not desirable, but generally any of the metals at least as heavy as aluminum can be used, including iron, copper, zinc, silver, gold, chromium, molybdenum, manganese, lead, nickel, aluminum, etc. Alloys, of such metals, of course, are also suitable. Where the method of the cited copending application is employed, a preferred subclass of metals and metal alloys comprise those of the iron family and alloys thereof which are capable of being magnetically positioned. Iron itself is therefore particularly preferred. Metal particles in the size range of 80 to 120 mesh (American Standard Screens) give particularly good results, although particles up to 40 mesh or down to 150 mesh can be used.

It will be understood that the dimensions of the components of the insulated container are not critical. However, by way of illustration, the following dimensions may be set out. The walls 10 and 11 may have an approximate thickness of .05 to .06 inch, while the lead coatings 13 and 14 may have a thickness of about one mil. The metal particles, which may be iron particles, such as the particles 16 and 17, may have a mesh size averaging about 100 mesh (American Standard Screen size). The walls themselves may be formed of polyformaldehyde resin, such as the resins sold under the trade names of Delrin and Celcon. The lead coatings 13 and 14 are electrodeposited by means of a suitable pretreating and electrodeposition procedure, as described in the cited copending application. The adhesive layer 15 can be formed of a low temperature solder, having a melting point below the point at which the plastic material of the walls loses mechanical strength. For example, where the walls are formed of a polyformaldehyde resin, a Cerro-Cast solder alloy (lead-tin-bismuth) having a M.P. of 285° F. is quite suitable. "Cerro-Cast" is manufactured by Corro Corporation of New York City, N. Y. Other lead solders can also be used, such as a eutectic ten-lead solder, rose metal, woods metal, etc.

The procedure for manufacturing a vacuum retaining plastic wall in accordance with the present invention is further illustrated by the following example.

*Example*

Powdered iron of 100 mash was cleaned with trichloroethylene and acetone washed to remove any greases on the surface of the particles. The magnetized surface of the mold was covered with the cleaned iron particles. An excess of the powder was used. The excess and weakly held outer particles were removed by an air blast or by vacuum. The strength of the magnetic field was then increased and the mold assembled. The desired shape was molded by injecting molten polymer into the mold cavity. For example, polyformaldehyde resin (Celcon) was used. After cooling, the molded object was removed.

The molded object was roughened by use of a liquid honer (a high velocity stream of water containing abrasive silica particles), then treated in a dilute solution of chromic acid (50 cc. distilled water, 3.8 gm. potassium dichromate, 25 cc. concentrated sufuric acid). A residence time of 3 minutes was used in the acid etch bath. The object was washed thoroughly with distilled water. Sensitization of the surface was done by immersing the object in a 1% solution of stannous chloride at 125° F. for 2 minutes. Following the sensitizing treatment the object was rinsed in distilled water and immersed in a dilute (0.3 gm/1,000 cc.) solution of palladium chloride for 2 minutes at room temperature. After removal from the seeding bath, the object was rinsed and immersed in an electroless nickel bath consisting of:

| | | |
|---|---|---|
| Nickel sulfate | gm | 35 |
| Sodium citrate | gm | 10 |
| Sodium acetate | gm | 10 |
| Sodium hypophosphite | gm | 15 |
| Magnesium sulfate sulfate | gm | 20 |
| Duponal C (1% sol) | cc | 10 |
| Distilled water | cc | 1,000 |

The bath was kept at 180–190° F. A residence time of 10 to 15 minutes produced a microscopic 0.0001 to 0.0002 in nickel film.

After rinsing, the object was placed in a lead plating bath for time sufficient to produce 1.5 to 2.0 mil thick plating. The bath consisted of:

| | | |
|---|---|---|
| Lead fluoroborate (50% solution) | fl. oz./gal | 27 |
| Boric acid | oz./gal | 2.0 |
| Fluoroboric acid (42%) | fl. oz./gal | 9.0 |
| Animal glue | fl. oz./gal | 0.03 |

The bath was operated at 75° F. at a pH of 1.0 or less. Current density of 10 amp/ft.$^2$ at a voltage of 4 was maintained during the plating operation.

While in the foregoing specification this invention has been described in relation to a vacuum insulated container and many details have been set forth for purpose of illustration, it will be apparent to those skilled in the art that the invention is susceptible to additional embodiments and that many of the details described herein can be varied considerably without departing from the basic principles of the invention. For example, the vacuum retaining plastic wall described herein can be used to provide one or all of the boundary walls enclosing the evacuated space or spaces in a wide variety of manufactured products.

We claim:

1. In a manufactured product having an enclosed space providing a high vacuum therein, a boundary wall for said space composed of a plastic material which is incapable per se of maintaining said high vacuum for an extended period of time, one surface of said boundary wall having an electroplated lead coating thereon forming a continuous layer for sealing said surface and making said wall vacuum retaining said lead coating having a thickness of the order of from .1 to 3 mils, whereby said boundary wall is capable of maintaining said high vacuum under conditions causing repeated expansion and contraction of said wall.

2. The product of claim 1 wherein the said vacuum within said enclosed space is higher than $10^{-3}$ mm. Hg.

3. The product of claim 1 wherein all walls surrounding said enclosed space have the construction of said boundary wall of claim 1.

4. The product of claim 1, wherein said lead coating is on the surface of said wall facing said enclosed space.

5. In a manufactured product having an enclosed space with a vacuum therein higher than $10^{-3}$ mm. Hg, a boundary wall for said space composed of a synthetic plastic which is incapable per se of maintaining said vacuum, and an electroplated lead coating on the surface of said wall facing said space, said coating being in the form of a continuous layer having a thickness of about .5 to 2.0 mils, and said coating sealing said wall and making it capable of retaining said vacuum.

References Cited by the Examiner

UNITED STATES PATENTS

| 1,672,904 | 6/1928 | Randall | 220—9 |
| 1,961,936 | 6/1934 | Mallinckrodt et al. | 220—64 |
| 2,538,524 | 1/1951 | Joseph | 220—9 |
| 2,643,021 | 1/1953 | Freedman | 220—9 |
| 2,739,881 | 3/1956 | Kepple | 156—91 X |
| 3,007,596 | 11/1961 | Matsch | 220—9 |

FOREIGN PATENTS 455,923  10/1936  Great Britain.

LOUIS G. MANCENE, *Primary Examiner.*

JAMES R. GARRETT, *Examiner.*